US010065542B2

(12) United States Patent
Gandhi et al.

(10) Patent No.: US 10,065,542 B2
(45) Date of Patent: Sep. 4, 2018

(54) VEHICLE OCCUPANT COOLING SYSTEM

(71) Applicant: Toyota Motor Engineering & Manufacturing North America, Inc., Erlanger, KY (US)

(72) Inventors: Umesh N. Gandhi, Farmington Hills, MI (US); Brian J. Pinkelman, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/431,316

(22) Filed: Feb. 13, 2017

(65) Prior Publication Data

US 2018/0215293 A1 Aug. 2, 2018

Related U.S. Application Data

(60) Provisional application No. 62/452,357, filed on Jan. 31, 2017.

(51) Int. Cl.
| | |
|---|---|
| *A47C 7/74* | (2006.01) |
| *B60N 2/56* | (2006.01) |
| *B60N 2/70* | (2006.01) |

(52) U.S. Cl.
CPC .............. *B60N 2/56* (2013.01); *B60N 2/5678* (2013.01); *B60N 2/70* (2013.01)

(58) Field of Classification Search
CPC ........... B60N 2/56; B60N 2/5678; B60N 2/70
USPC .............................. 297/180.1, 180.11, 180.12
See application file for complete search history.

(56) References Cited

U.S. PATENT DOCUMENTS

| | | | | |
|---|---|---|---|---|
| 4,964,402 | A * | 10/1990 | Grim ..................... | A61F 5/0111 602/2 |
| 6,132,455 | A * | 10/2000 | Shang .................... | A47C 7/744 5/654 |
| 6,291,803 | B1 | 9/2001 | Fourrey | |
| 6,578,910 | B2 * | 6/2003 | Andersson .............. | A47C 7/74 297/180.11 |
| 8,556,337 | B1 * | 10/2013 | Cornitius-Cary ...... | A47C 7/021 297/180.11 X |
| 9,440,572 | B2 * | 9/2016 | Hall ..................... | B60N 2/5614 |
| 2010/0052374 | A1 * | 3/2010 | Bell .................... | B60H 1/00271 297/180.12 |
| 2010/0327637 | A1 * | 12/2010 | Bajic .................... | B60N 2/5635 297/180.12 |

(Continued)

*Primary Examiner* — Rodney B White
(74) *Attorney, Agent, or Firm* — Christopher G. Darrow; Darrow Mustafa PC (57) ABSTRACT

A seat for a vehicle is provided includes a padding member and at least one phase change material element supported in a passage formed within the padding member. The at least one phase change material element is supported in the passage so as to be movable between a first location in which the at least one phase change material element is spaced apart from an occupant support side of the padding member when the seat is unoccupied, and a second location in which at least a portion of the at least one phase change material element is at least level with the occupant support side of the at least one padding member when the seat is unoccupied. The at least one phase change material element is structured to absorb heat from a vehicle occupant, thereby cooling the occupant.

19 Claims, 7 Drawing Sheets

(56) References Cited

U.S. PATENT DOCUMENTS

2014/0152058 A1\* 6/2014 Line ................. B60N 2/56
                                             297/180.12
2015/0296994 A1   10/2015 Mikkelsen et al.
2017/0354190 A1\* 12/2017 Cauchy ............. A41D 13/005

\* cited by examiner

VEHICLE OCCUPANT COOLING SYSTEM

CROSS REFERENCE TO RELATED APPLICATIONS

This application claims benefit of U.S. Provisional Application No. 62/452,357, filed on Jan. 31, 2017, which is herein incorporated by reference in its entirety.

TECHNICAL FIELD

The present invention relates to vehicle occupant comfort and, more particularly, to a method for cooling a vehicle occupant when an interior of the vehicle is at an elevated temperature.

BACKGROUND

The interior of a vehicle, especially vehicle seats, may heat significantly due to sunlight streaming through the vehicle windows. The temperature of the seats may even exceed the temperature of the occupant's skin if the exposure to sunlight is long term and the ambient temperature outside the vehicle is high enough so that heat transfer from the seats to the vehicle interior and from the vehicle interior to the vehicle exterior are impeded. In such cases, the vehicle seat may actually transfer additional heat to an occupant who is already hot. Thus, the vehicle occupant may find the heated seats very uncomfortable until the seats can be cooled, for example, using the vehicle air conditioning system.

SUMMARY

In one aspect of embodiments described herein, a seat for a vehicle is provided. The seat includes padding member and at least one phase change material element supported in a passage formed within the at least one padding member. The at least one phase change material element is supported in the passage so as to be movable between a first location in which the at least one phase change material element is spaced apart from an occupant support side of the padding member when the seat is unoccupied, and a second location in which at least a portion of the at least one phase change material element is at least level with the occupant support side of the padding member when the seat is unoccupied.

In another aspect of embodiments described herein, a sub-assembly for a vehicle seat is provided. The sub-assembly includes a padding member having at least one passage formed therein and extending between a first side of the padding member and a second side of the padding member opposite the first side. The at least one passage has a first opening along the first side of the padding member. The sub-assembly also includes at least one phase change material element supported in the at least one passage such that compression of the padding member along the first side in a direction toward the at least one phase change material element moves the passage first opening toward the at least one phase change material element until the at least one phase change material element is positioned within the passage first opening.

DETAILED DESCRIPTION

Embodiments described herein relate to a vehicle seat having an occupant cooling structure incorporated therein. The cooling structure includes phase change material (PCM) elements positioned within passages formed in a padding member of the seat. The PCM elements are mounted in the seat so as to be movable between first locations and second locations within the passages. In the first locations of the PCM elements, the elements are held in positions where they may be in thermal communication with a vehicle occupant seated on and bearing against the padding member. In the first locations, the PCM elements may absorb heat from the seated occupant. The PCM elements may be manually or automatically movable to second locations where the elements are exposed to an exterior of the padding member when the occupant is no longer seated. This facilitates the transfer of heat previously absorbed from the occupant, from the PCM elements to the vehicle interior. In this manner, the heated PCM elements may be cooled. The padding member may help insulate the PCM elements from heat in the vehicle interior when the PCM elements are in the first locations within the padding member.

Figure 1:
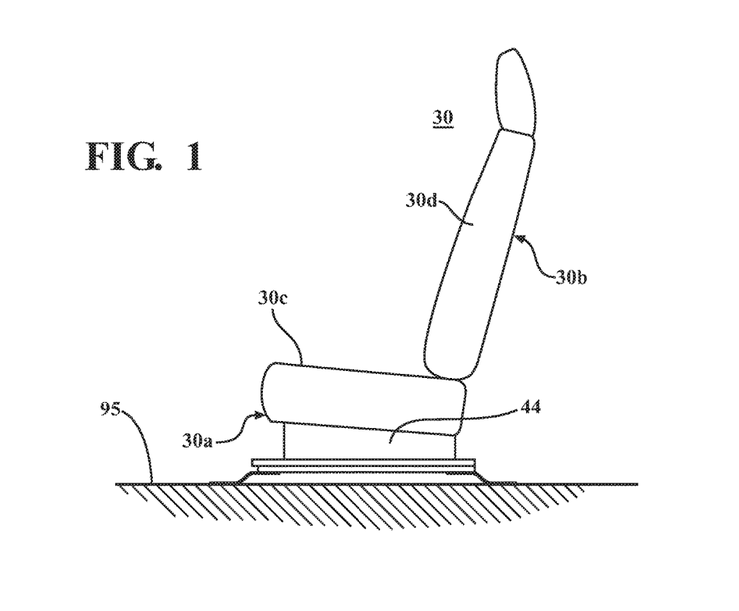
FIG. 1 is a schematic side view of a vehicle seat 30 incorporating a vehicle occupant cooling system in accordance with an embodiment described herein.

FIG. 1 is a schematic side view of a vehicle seat 30 incorporating a vehicle occupant cooling system in accordance with an embodiment described herein. Embodiments of the cooling system may be configured to absorb heat from a vehicle occupant seated in the seat 30, to aid in cooling the occupant. The vehicle occupant cooling system may include an arrangement of phase change material (PCM) elements configured to absorb heat from an occupant of the vehicle seat 30. Seat 30 may be mounted to a floor 95 of a vehicle interior so as to be moveable parallel to a fore-aft axis of the vehicle in a known manner (for example, along a set of rails). Seat 30 may include a seat bottom 30a and a seat back 30b rotatably coupled in a conventional manner to the seat bottom 30a.

Figure 2A:
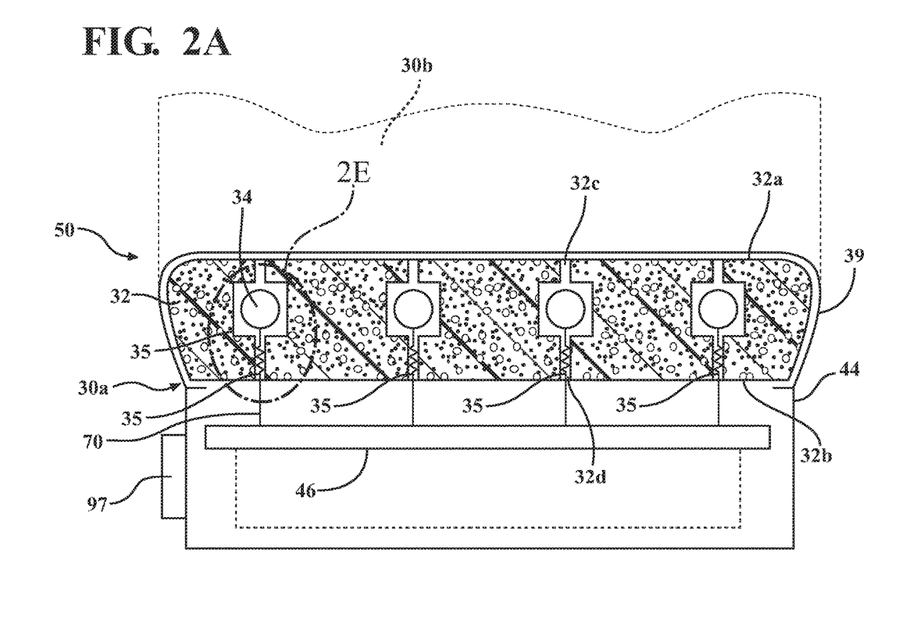
FIG. 2A is a schematic frontal cross-sectional view of a bottom portion 30a of the seat shown in FIG. 1.
Figure 2B:
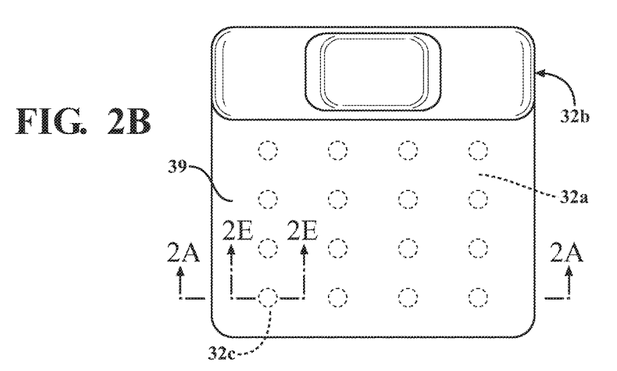
FIG. 2B is a schematic plan view of the seat shown in FIGS. 1 and 2A.

FIG. 2A is a schematic frontal view of a bottom portion 30a of the seat shown in FIG. 1. FIG. 2B is a schematic plan view of the seat shown in FIGS. 1 and 2A. Referring to FIGS. 1-2B, seat 30 may include a housing 44, at least one padding member 32 mounted in or to the housing 44, and at least one phase change material (PCM) element 34 supported in an associated passage 35 formed within the padding member 32. As shown in the drawings, the padding member 32 may include a plurality of spaced-apart passages 35, each passage including an associated PCM element 34 supported therein as just described. Each PCM element may also move and operate as described herein. The phase change material element 34 may be coupled to a movable mounting tray 46 using a support mechanism 70, which may support the phase change material element 34 in the housing 44 and within the padding member 32. The mounting tray 46 may be movably positioned within (or mounted to) the housing 44, as described in greater detail below. The mounting tray 46 may be operatively coupled to a mounting tray positioning mechanism 48 provided for moving the mounting tray 46.

Housing 44 may be structured to enable mounting of various elements of the vehicle occupant cooling system therein or thereto, such as the mounting tray 46, the mounting tray positioning mechanism 48, and other elements as needed, depending on the particular design of the vehicle occupant cooling system. Housing 44 may be formed from any suitable material or materials, including metallic materials and/or polymeric materials. The housing 44 may be secured to the vehicle floor 95 or to a mechanism (such as rails) enabling flexible positioning of the housing along the vehicle floor. In one or more arrangements, the housing 44 and elements of the vehicle occupant cooling system mounted thereto may serve as the bottom 30a of the seat 30 as shown in FIGS. 1-2G.

Figure 2C:
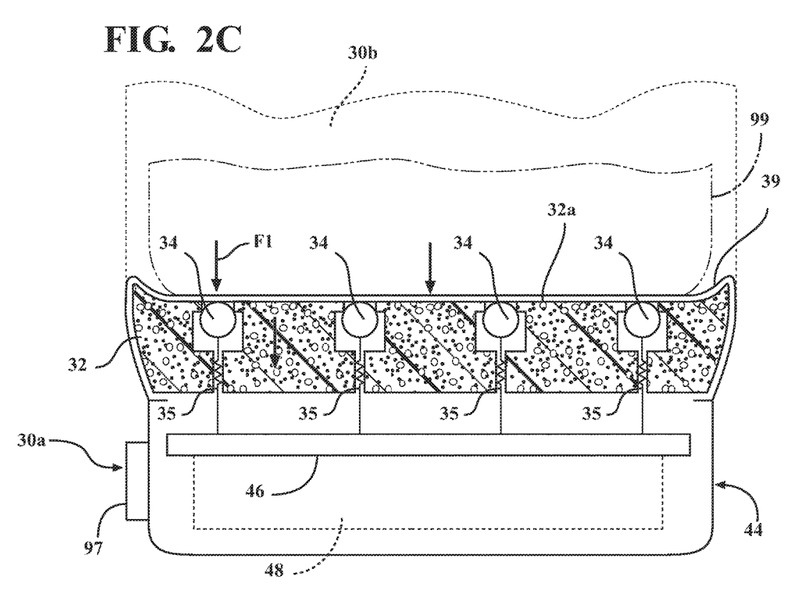
FIG. 2C is the schematic view of FIG. 2A showing compression of a padding member of a seat bottom resulting from an occupant sitting in the seat, resulting in thermal communication between the occupant and phase change material elements positioned within the padding member.
Figure 2D:
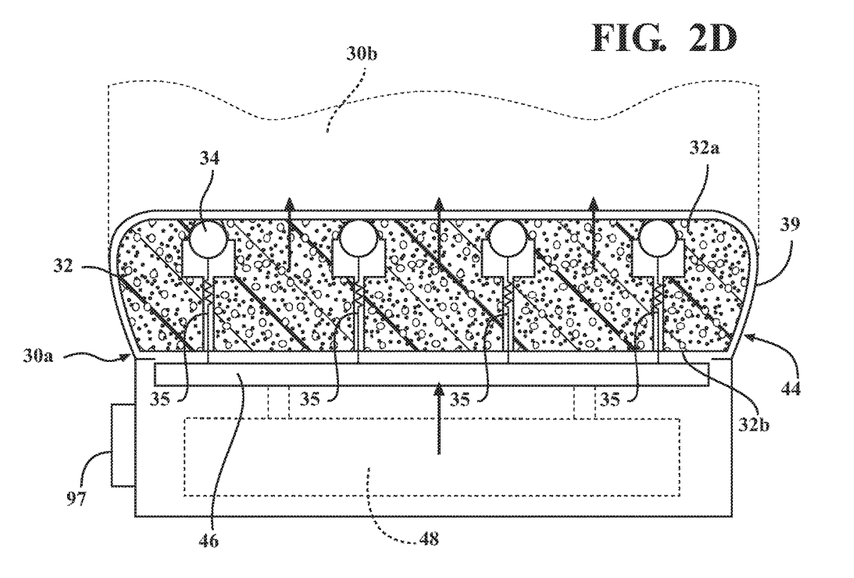
FIG. 2D is the schematic frontal view of FIG. 2A showing positioning of the phase change material elements in openings of their respective passages when the elements have been raised by movement of an associated mounting tray.

FIG. 2C is the schematic frontal view of FIG. 2A showing deformation of the padding member 32 as an occupant 99 sits on the seat bottom 30a while the mounting tray 46 is in a first position. The drawing shows the PCM elements 34 positioned in the passage first openings 32c and in contact with the cover 39 which, in turn, is in contact with the occupant 99. Padding member 32 may be structured to cushion an occupant 99 seated in the seat 30. Referring to FIGS. 2A-2E, padding member 32 may have a first or occupant support side 32a and a second side 32b opposite the first side 32a. An occupant support side 32a of the padding member 32 may be a side or surface of the padding member 32 on which an occupant 99 of the seat 30 directly exerts pressure when seated. One or more passages 35 may extend between occupant support side 32a and second side 32b. Each of passages 35 may have a first opening 32c along the first side 32a and a second opening 32d along the second side 32b of the padding member 32.

Figure 2E:
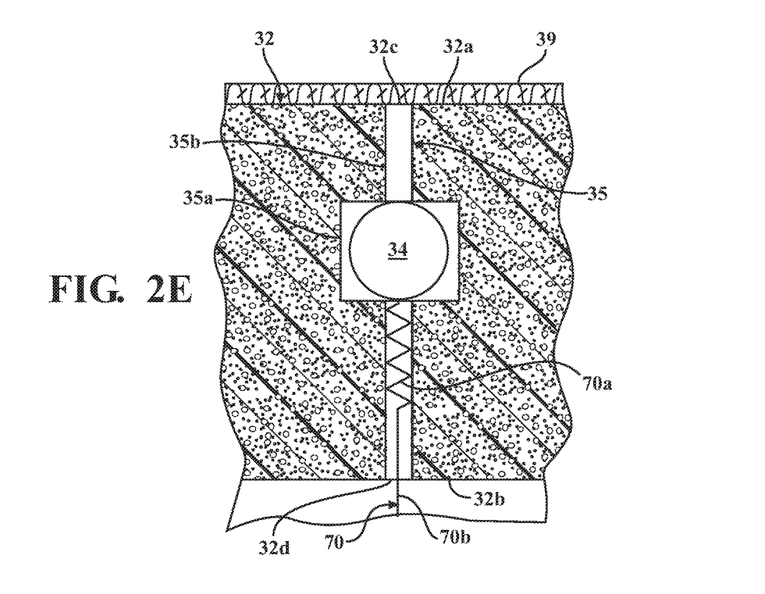
FIG. 2E is a magnified schematic cross-sectional view of a phase change material element positioned in a cavity formed in the padding member 32.

The padding member 32 may also be structured to thermally insulate a phase change material element 34 positioned in the passage 35 prior to positioning of the phase change material element 34 the first opening 32c of the passage, as described below. Referring to FIG. 2E, in one or more arrangements, each passage 35 may have a first, relatively wider portion 35a structured for receiving therein the phase change material element 34 prior to compression of the padding member 32 resulting from an occupant sitting in the seat 30. The wider portion 35a may form a cavity structured for receiving the phase change material element 34 therein. Each passage 35 may also have a second, relatively narrower passage portion 35b extending from the relatively wider portion 35a to the occupant support side 32a of the padding member 32. The walls of the relatively narrower passage portion 35b may be structured to stretch to accommodate movement of the phase change material element 34 therealong as the mounting tray 46 is moved from the first position to the second position as described herein.

The composition of the padding member 32 and the dimensions of the padding member passages 35 and the phase change material elements 34 (described in greater detail below) may be structured to permit movement of the phase change material elements 34 along and relative to the walls of their respective passages 35, as described herein. For example, referring to FIG. 2C, pressure applied to the padding member 32 by a vehicle occupant 99 along first side 32a may compress the padding residing between the phase change material element 34 and the first side 32a, in a direction toward the phase change material element. This pressure may force the phase change material element 34 to stretch and wedge open the relatively narrower portion 35b of the passage 35 as compression of the padding continues. The stretched or expanded walls of the narrower portion 35b of the passage may then move along the exterior of the phase change material element 34 as the padding member is compressed, until the phase change material element 34 resides within the opening 32c, as shown in FIG. 2C.

Figure 2F:
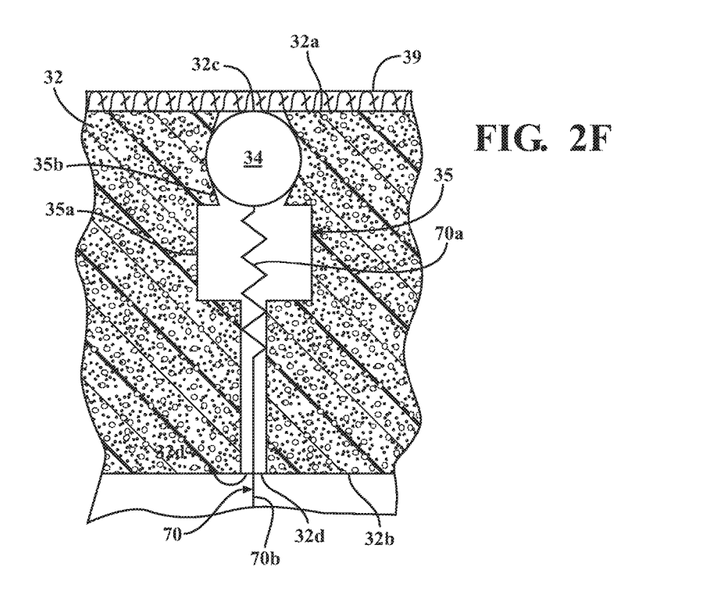
FIG. 2F is the view of FIG. 2E showing movement of a phase change material element in a passage to a position within an opening of the passage to enable thermal communication between the phase change material element and an exterior of the padding member, for cooling the phase change material element.
Figure 2G:
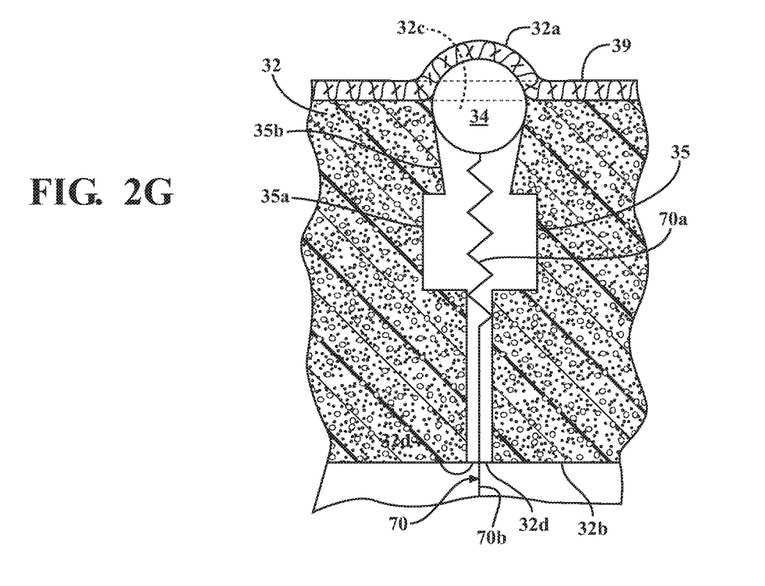
FIG. 2G is the view of FIG. 2F showing movement of a phase change material element in a passage to another position within the opening of the passage to enable thermal communication between the phase change material element and an exterior of the padding member, for cooling the phase change material element.

A phase change material element 34 is considered to be positioned within the passage opening 32c when at least a portion of the phase change material element is level with the padding member first side 32a as shown in FIGS. 2C and 2F, or when at least a portion of the phase change material element 34 extends from the passage 35 above or past the padding member first side 32a, as shown in FIG. 2G. The position of the phase change material element 34 shown in FIG. 2C may enable the phase change material element 34 to contact a seat cover 39 which is also in contact with the occupant 99. This contact may establish thermal communication between the phase change material element 34 and the occupant 99, for cooling of the occupant. The position of the phase change material element 34 shown in FIGS. 2F and 2G may also enable the phase change material element 34 to contact the seat cover 39, to facilitate heat transfer from the phase change material element 34 through the cover 39 and into the vehicle interior, for purposes of cooling the phase change material element 34.

Narrowing of the passage 35 between the relatively wider portion 35a and the padding member first side 32a may improve insulation of the phase change material element 34 within the padding member 32 prior to compression of the padding, to aid in preventing heating of the phase change material element 34 when the vehicle interior is hot. Similarly, narrowing of the passage 35 between the relatively wider portion 35a and the padding member second side 32b as shown in FIG. 2E may improve insulation of the phase change material element 34 within the padding member 32, to aid in preventing heating of the phase change material element 34 when the vehicle interior is hot. Padding member 32 may be formed from any suitable material, such as a foam material used conventionally for vehicle seat cushions. If desired, a padding member material may be selected which both meets cushioning requirements and has favorable thermal insulative properties, so that the padding member 32 may help thermally insulate the PCM elements 34 when the elements are positioned within passage portions 35a as described herein.

Phase change materials are known materials which can store and release energy through phase transition. The energy may be in the form of heat. The phase change material elements described herein may utilize a transition between the liquid and solid phases. When the PCM is in a solid phase, it absorbs heat as the external temperature rises. When the external temperature reaches the melt point of the PCM, the PCM will begin to melt, or change phase from a solid to a liquid. During the transition from solid to liquid, the PCM will absorb large amounts of heat with almost no change in temperature. During this phase change period, the PCM may provide a cooling effect. A reverse process may occur as the external temperature drops. That is, a PCM in its liquid phase may release heat as the external temperature decreases and the PCM changes phase from a liquid phase to a solid phase, thereby providing a warming effect. One possible source of phase change materials suitable for the applications described herein is Microtek Laboratories, Inc., of Dayton, Ohio. In one or more arrangements, the PCM elements may be formed using any of various PC materials encapsulated into spheres. In one or more arrangements, PCM spheres may have diameters in the range of 8-10 millimeters, inclusive. Alternatively, the PCM elements may have any other suitable shape or shapes. Phase change materials which may be contained or encapsulated into various shapes and which may be suitable for the applications described herein may include paraffins (wax), fatty acids (oils), polyglycols, salt hydrates, water solutions, and/or other materials.

Although the drawings show a specific number of phase change material elements 34 incorporated into the vehicle seat 30 for purposes of illustrating the concepts described herein, any desired number of phase change material elements 34 may be incorporated into the seat to increase the cooling capacity of the seat. The maximum number of phase change material elements 34 which can be positioned in the seat may be determined by the area available in the padding member, the sizes of the phase change material elements, and other pertinent factors.

Each phase change material element 34 may be supported in the housing 44 and coupled to the mounting tray 46 by an associated support mechanism 70 coupled to the phase change material element 34 and to the mounting tray 46 (described in greater detail below). As seen in FIGS. 2D and 2E, the support mechanism 70 may extend from the mounting tray 46 into the passage second opening 32d to support a phase change material element 34 positioned within the padding member. In one or more arrangements, the support mechanism 70 may include a stalk 70b connected to the mounting tray 46, and a spring member 70a connecting the stalk 70b to the phase change material element 34.

The spring member 70a may structured to resist compression of the spring member during compression of the padding member 32 along the first side 32a until the phase change material element 34 is positioned within the opening 32c along the occupant support side 32a of the padding member due to deflection of the occupant support side (for example, due to an occupant sitting in the seat). The stiffness of the spring member 70a may be specified so that compression of the padding member 32 by the occupant 99 may force the padding member first side 32a and the first opening 32c toward the PCM element 34, as the walls of the narrower passage portion 35b expand and slide along the PCM element 34 as shown in FIG. 2C. When the phase change material element 34 is positioned within the first opening 32c as shown in FIG. 2C, the phase change material element 34 may contact the seat cover 39, thereby enabling thermal communication between the occupant and the phase change material element 34 through the cover 39.

The spring member 70a may also be structured to compress responsive to a force exerted by the occupant 99 on the PCM element 34 after the padding member first side 34a deflects to a point where the PCM element 34 is positioned within the passage first opening 32c and contacts the cover 39. At this point, further compression of the padding member first side 32a (due to the weight of the occupant 99) may press on the PCM element 34 through the cover, moving the PCM element 34 toward the stalk 70b and forcing the spring member 70a to resiliently shorten.

The padding member 32 may be covered by a seat cover 39 formed from any suitable seat covering material. In one or more arrangements, a cover material and/or cover thickness may be selected which has an inherently relatively higher thermal conductivity and/or which will interfere as little as possible with heat transfer between the occupant and the PCM elements 34. Alternatively, a thermally-conductive fabric or cover material may be used, to facilitate heat transfer between the occupant and the PCM elements. A thermally-conductive cover material may be defined as a fabric or other material deemed suitable for covering the padding member 32 and which is also specially structured to facilitate or promote heat transfer through the material. For example, fabrics incorporating carbon nanotubes or other high-thermal conductivity nanoscale fillers may be used.

The cover 39 may be structured to be in intimate contact with the padding member first side 32a, so that the PCM elements 34 will contact the cover 39 when they are positioned in their respective passage openings 32c. Heat may be transferred from the occupant 99 through the cover 39 to the PCM elements 34 when the occupant is seated in the seat, which may help cool the occupant. Heat may also be transferred from the PCM elements 34 to the vehicle interior when the elements are in contact with the cover, with no occupant seated in the seat.

PCM elements 34 may be coupled to the mounting tray 46 so as to be movable along with the mounting tray. Mounting tray 46 may be positioned within the housing 44 so as to be movable between a first position (shown in FIGS. 2A and 2C) and a second position (shown in FIGS. 2D and 2F). In the first position, the mounting tray 46 supports the phase change material elements 34 so that they are spaced apart from the first or occupant support side 32a of the padding member 32 (as shown in FIG. 2A, for example) until an occupant 99 is seated in the seat 30 (as shown in FIG. 2C). In the second position, the mounting tray 46 may support the phase change material elements 34 in locations in which at least a portion of each phase change material element 34 is at least level with the occupant support side 32a of the padding member 32 (as shown in FIGS. 2D and 2F) and in contact with the cover 39 when an occupant is not seated in the seat. In particular embodiments, when in the second position, the mounting tray may support the phase change material elements 34 in locations where at least a portion of each phase change material element 34 extends from the passage 36 at least partially beyond the occupant support side 32*a* of the padding member 32 as shown in FIG. 2G. When the phase change material elements 34 are at least level with the occupant support side 32*a* of the padding member 32 (FIG. 2F) or extend from the passage 36 at least partially beyond the occupant support side 32*a* of the padding member 32 (FIG. 2G), the phase change material elements 34 reside in locations suitable for more efficiently transferring heat to an interior of the vehicle when the occupant is not seated in the seat.

A mounting tray positioning mechanism 48 may be operatively connected to the mounting tray 46. The mounting tray positioning mechanism 48 may be operable to move the tray 46 between the first and second positions described above. The positioning mechanism 48 may also be structured to secure the tray 46 in one of the first and second positions until the tray is moved to the other one of the first and second positions. FIG. 2D is the schematic frontal view of FIG. 2A showing the PCM elements 34 when the mounting tray 46 has been raised by operation of a mounting tray positioning mechanism 48 as described herein, from the first position to a second position.

In one or more arrangements, the mounting tray positioning mechanism 48 is structured to be manually operable. For example, an actuation lever 97 may be operatively connected to a lockable lifting mechanism (for example, a camming system or a suitable mechanical linkage). The positioning mechanism 48 may be actuated by the lever 97 to lift the mounting tray 46 from the first position to the second position of the mounting tray after an occupant leaves the seat 30, to facilitate heat transfer from the heated PCM elements to the interior of the vehicle in situations where the vehicle interior temperature will be lower than the temperatures of the PCM elements. In one example, the tray 46 is left raised overnight when the vehicle interior may be relatively cooler, so that the PCM elements 34 may efficiently transfer heat to the interior. The tray 46 may be then lowered by the occupant to the first position (to shift the PCM elements to their occupant-cooling positions) when the occupant is ready to use the vehicle. The positioning mechanism 48 may also be actuated by the lever 97 to lower the mounting tray 46 to the first position of the mounting tray prior to an occupant 99 sitting in the seat 30. Subsequently, when the occupant 99 sits in the seat, the padding member 32 may be compressed as described herein to bring the occupant into thermal communication with the phase change material elements 34, as previously described.

Figures 4A, 4B:
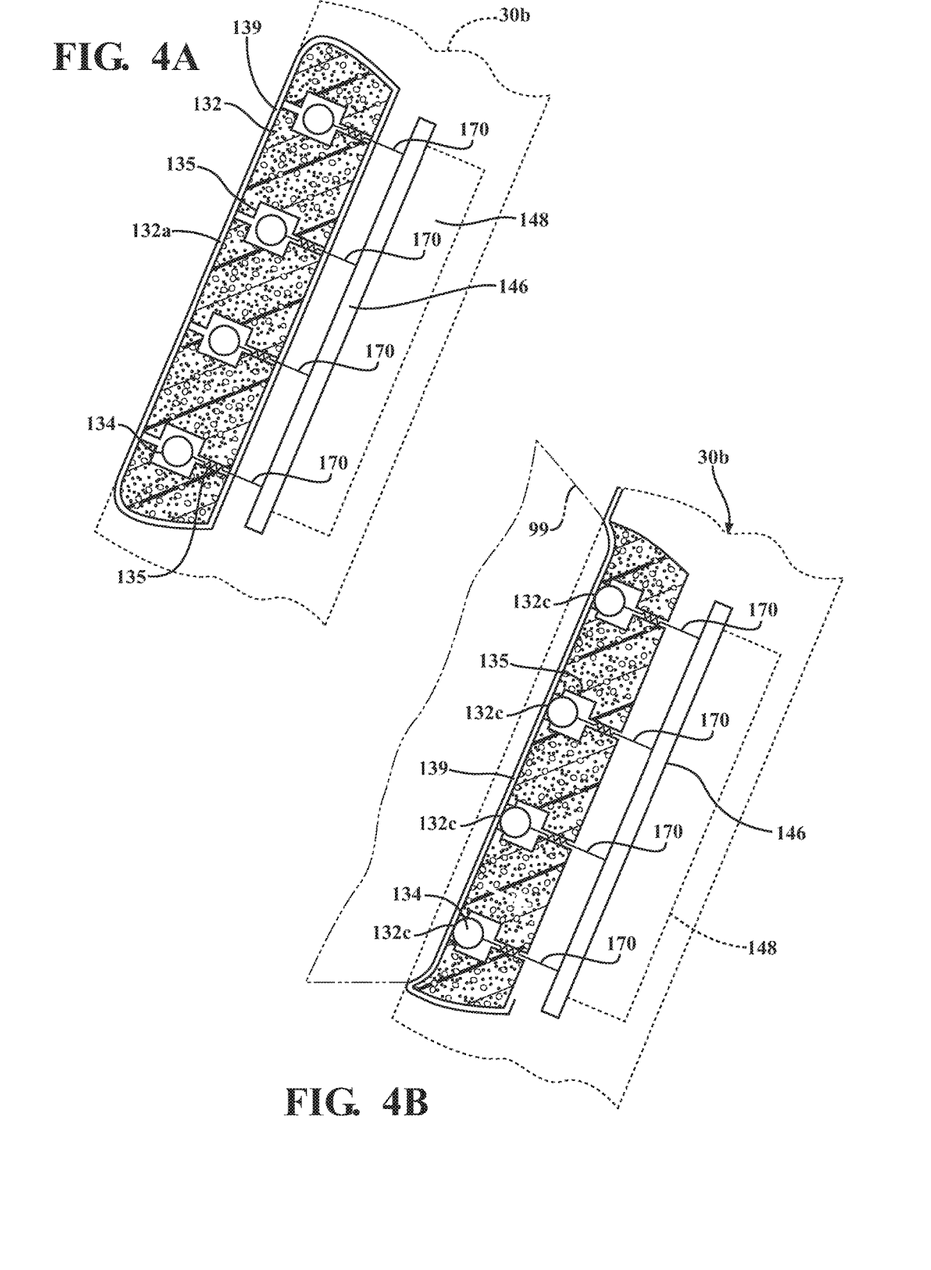
FIG. 4A is a schematic partial side cross-sectional view of a seat back incorporating a padding member and phase change material elements, in accordance with another embodiment similar to the embodiment previously described with respect to the seat bottom of FIGS. 2A-2G.
FIG. 4B is the schematic view of FIG. 4A showing compression of a padding member of a seat bottom resulting from an occupant sitting in the seat, resulting in thermal communication between the occupant and phase change material elements positioned within the padding member.
Figure 4C:
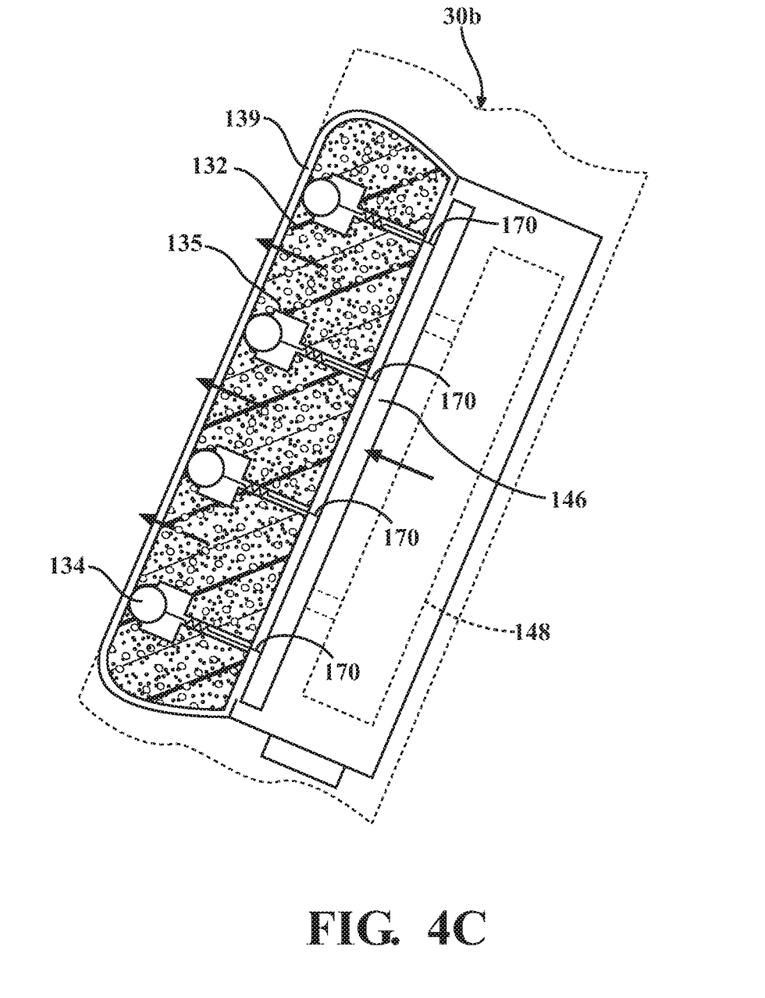
FIG. 4C is the schematic view of FIG. 4B showing positioning of the phase change material elements in openings of their respective passages when the elements have been raised by movement of an associated mounting tray.

Elements of the vehicle occupant cooling system described above may be incorporated into a seat bottom 30*a* as shown in FIGS. 2A-2G, or these vehicle occupant cooling system elements may be incorporated into a seat back 30*b* as shown in FIGS. 4A-4C. FIG. 4A is a partial side cross-sectional view of a seat back (such as seat back 30*b*) incorporating elements of a vehicle occupant cooling system as previously described with respect to FIGS. 1-2G. The system includes a padding member 132 and PCM elements 134 mounted therein in a manner similar to those previously described with respect to seat bottom 30*a*. FIG. 4B is the schematic side view of FIG. 4A showing deformation of the padding member 132 as an occupant 99 rests against the seat back 30*b*. The drawing shows the PCM elements 134 positioned in first openings 132*c* of passages 135 in contact with a seat cover 139 which, in turn, is in contact with the occupant 99.

Various elements of the seat 30 just described may be combined to form an embodiment of a sub-assembly 50 for a vehicle seat. In one or more arrangements, the sub-assembly 50 may include at least one padding member with PCM elements 34 positioned therein, as previously described. The sub-assembly may include a housing 44 to (or within) which the padding member 32 is mounted. The sub-assembly 50 may also include the PCM elements 34, their associated support mechanisms 70, the seat cover 39, the mounting tray 46, and the mounting tray positioning mechanism 48. The sub-assembly 50 may also include additional elements. An embodiment of a sub-assembly 50 as described herein may form at least a portion of a seat bottom (such as seat bottom 30*a*) or a seat back (such as seat back 30*b*).

Figure 3:
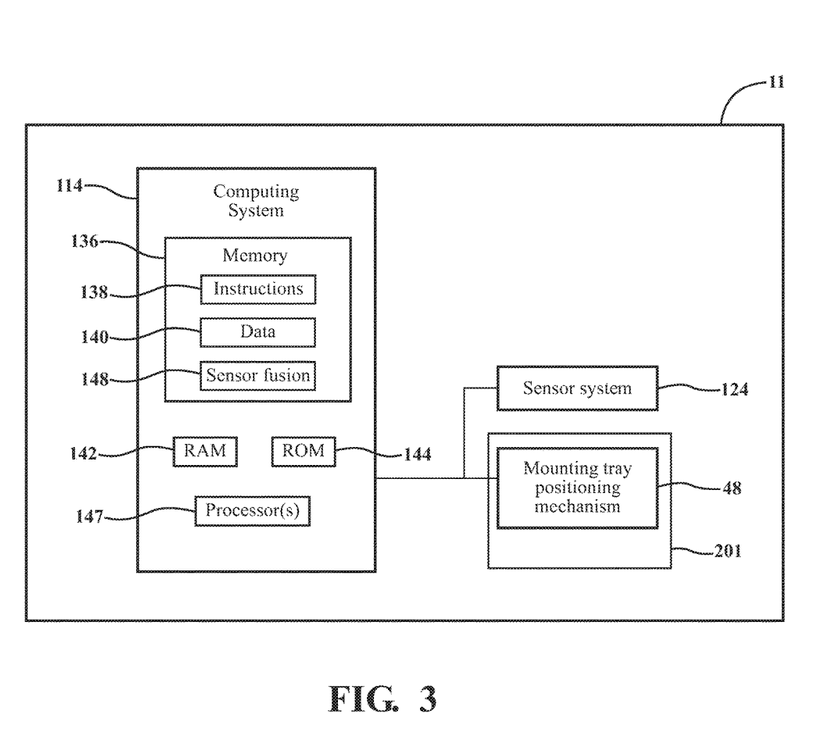
FIG. 3 is a functional block diagram illustrating an exemplary vehicle 11 incorporating a vehicle occupant cooling system in accordance with an embodiment described herein.

FIG. 3 is a functional block diagram illustrating an exemplary vehicle 11 incorporating an vehicle occupant cooling system 201 in accordance with an embodiment described herein. The vehicle 11 may take the form of a car, truck, or other vehicle. The vehicle 11 may be configured to operate fully or partially in an autonomous mode. In an autonomous mode, the vehicle 11 may be configured to operate without human interaction. For example, elements of the vehicle occupant cooling system 201 described herein may be automatically operated by a controller or computing system. The vehicle 11 may include various systems, sub-systems and components in operative communication with each other, such as a sensor system or array 124, a computing system 114, the vehicle occupant cooling system 201, and other systems and components needed for operating the vehicle as described herein. The vehicle 11 may include more or fewer systems and each system could include multiple elements. Further, each of the systems and elements of vehicle 11 may be interconnected. Thus, one or more of the described functions of the vehicle 11 may be divided up into additional functional or physical components or combined into fewer functional or physical components. In some further examples, additional functional and physical components may be added to the examples illustrated by FIG. 3.

The computing system 114 may be operatively connected to the other vehicle systems and elements and may be configured so as to control and operate the vehicle 11 and its components as described herein. The computing system 114 may be configured to control at least some systems and/or components autonomously (without user input) and/or semi-autonomously (with some degree of user input). The computing system may also be configured to control and/or execute certain functions autonomously and/or semi-autonomously. The computing system 114 may control the functioning of the vehicle 11 based on inputs and/or information received from various sensors of the sensor system 124.

FIG. 3 illustrates a block diagram of an exemplary computing system according to one or more illustrative embodiments of the disclosure. The computing system 114 may have some or all of the elements shown in FIG. 3. In addition, the computing system 114 may also include additional or alternative components as needed or desired for particular applications. The computing system 114 may also represent or be embodied in a plurality of controllers or computing devices that may process information and/or serve to control individual components or systems of the vehicle 11 in a distributed fashion.

The computing system 114 may include one or more processors 147 (which could include at least one microprocessor) for controlling overall operation of the computing system 114 and associated components, and which execute instructions stored in a non-transitory computer readable medium, such as the memory 136. "Processor" means any component or group of components that are configured to execute any of the processes and/or process steps described herein or any form of instructions to carry out such processes/process steps or cause such processes/process steps to be performed. The processor(s) 147 may be implemented with one or more general-purpose and/or one or more special-purpose processors. The processor(s) 147 can include at least one hardware circuit (e.g., an integrated circuit) configured to carry out instructions contained in program code. In arrangements in which there is a plurality of processors 147, such processors can work independently from each other or one or more processors can work in combination with each other. In one or more arrangements, the processor(s) 147 can be a main processor of the vehicle 11. For instance, the processor(s) 147 can be part of an electronic control unit (ECU).

In some embodiments, the computing system 114 may include RAM 142, ROM 144, and/or any other suitable form of computer-readable memory. The memory 136 may comprise one or more computer-readable memories. A computer-readable storage or memory 136 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. The memory or memories 136 can be a component of the computing system 114, or the memory or memories can be operatively connected to the computing system 114 for use thereby. The terms "operatively connected" and "operatively coupled" as used throughout this description can include direct or indirect connections, including connections without direct physical contact. The memory 136 may contain data 140 and/or instructions 138 (e.g., program logic) executable by the processor(s) 147 to execute various functions of the vehicle 11. The memory 136 may contain additional instructions as well, including instructions to transmit data to, receive data from, interact with, or control one or more of the vehicle systems and/or components described herein (for example, vehicle occupant cooling system 201).

Vehicle sensor system 124 may be in operative communication with computing system 114 and other vehicle systems and components. In a known manner, the sensor system 124 includes sensors configured to provide data usable by the computing system 114 in formulating and executing suitable control commands for the various vehicle systems. In arrangements in which the sensor system 124 includes a plurality of sensors, the sensors can work independently from each other. Alternatively, two or more of the sensors can work in combination with each other.

Sensor system 124 may include sensors operable to obtain data which may be used (by the pertinent sensors and/or in conjunction with computing system 114) to control operation of the vehicle occupant cooling system as described herein. The data gathered by the sensor system 124 may include a temperature of the vehicle interior and the temperatures of one or more individual PCM elements positioned in the vehicle seat 30, the presence or absence of an occupant in the vehicle or in a particular seat, and other information. Individual ones of sensors 124 configured for the purposes described herein may be positioned in the seat 30 or in any other portion of the vehicle.

In one or more arrangements, the mounting tray positioning mechanism 48 may be configured for automated operation, using a suitable motor or drive mechanism (not shown) incorporated into (or in operative communication with) the mounting tray positioning mechanism 48. The mounting tray positioning mechanism 48 may be operatively coupled to the computing system 114, so that the computing system may automatically control operation of the positioning mechanism 48 under certain conditions.

For example, the mounting tray positioning mechanism 48 may be operatively coupled to computing system 114 and at least one sensor of sensor system 124 configured to determine one or more temperatures. The computing system 114 may be configured to, using temperature data from the sensors 124, determine a temperature or a temperature difference. The computing system 114 may then actuate the positioning mechanism 48 to control the position of the mounting tray 46 responsive to the temperature or temperature difference.

The one or more temperatures determined by the sensors 124 may be temperatures of one or more of the PCM elements 34. Sensors may also measure a temperature of the vehicle interior. The temperature difference may be the difference between a highest-temperature one of the PCM elements 34 and a measured temperature of the vehicle interior. Thus, the computing system may determine the temperature of the highest-temperature one of the PCM elements 34 and the temperature of the vehicle interior. The computing system may then determine the difference between these temperatures and compare this difference to a threshold. If the difference is greater than the threshold, the computing system may automatically operate the mounting tray positioning mechanism 48 to raise the mounting tray 46 to the second position. The threshold may be selected so as to help ensure at least a predetermined minimum level of exhaust heat transfer between the highest-temperature one of the PCM elements 34 and the vehicle interior, given the surface area of the PCM element that is exposed directly to the vehicle interior and not covered by the padding member 32. Alternatively, the computing system may automatically raise the mounting tray 46 to the second position if the temperature of the vehicle interior is lower than the temperature of the highest-temperature one of the PCM elements 34.

In another possible application, one or more sensors may be configured to detect when a person is entering and leaving the vehicle, and which seat the person is entering or occupying. For example, one or more cameras or other sensors (such as ultrasonic sensors) may be mounted in the passenger compartment and configured to detect the entry into (or exit from) the vehicle by an occupant and/or to detect when a door of the vehicle is opened. One or more sensors may also be configured to detect when a seat incorporating elements of the vehicle occupant cooling system is unoccupied. Types of sensors usable for the applications described herein may include various types of temperature sensors (such as thermocouples), proximity sensors (for example, various ultrasonic sensors), and sensors for measuring other characteristics or conditions. Those skilled in the art may recognize that many different types of sensors which may be used to detect the entry of an occupant into the vehicle, or the exit of an occupant from the vehicle.

The computing system 114 may automatically control the mounting tray positioning mechanism 48 to move the mounting tray 46 from its first (or lower) position to its second (or raised) position responsive to a determination that an occupant has exited the vehicle or is leaving a seat which includes the vehicle occupant cooling system, in combination with a determination that a temperature difference between the vehicle interior and the highest-temperature one of the PCM elements 34 is sufficient for at least a certain minimum rate of heat transfer. This automated function enables cooling of the PCM elements when an exiting occupant forgets to raise the mounting tray manually before exiting and closing the vehicle.

The computing system 114 may also automatically control the mounting tray positioning mechanism 48 to move the mounting tray 46 from its second position to its first position responsive to a determination that a person is entering the vehicle and/or appears to be occupying a seat which includes the vehicle occupant cooling system and in which the mounting tray 46 is currently raised to the second position. The computing system 114 may lower the mounting tray (thereby lowering the PCM elements supported by the mounting tray) prior to the occupant occupying the seat. This enables automated retraction or lowering of a raised mounting tray to prevent possible damage to the PCM element support mechanisms 70 which may result from the occupant sitting in the seat and pressing down on the support mechanisms 70 when the tray 46 is raised.

An embodiment of the vehicle occupant cooling system incorporated into the seat back 30*b* may include the same elements and operate in the same manner as an embodiment of the cooling system incorporated into the seat bottom, as described above. For example, as shown in FIGS. 4A-4C, a seat back 30*b* may include padding member 132 including passages 135 and PCM elements 134 positioned therein, seat cover 139, PCM element support mechanisms 170, mounting tray 146, mounting tray positioning mechanism 148, and other elements and features as previously described.

In the preceding detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The flow diagrams and block diagrams in the figures illustrate the architecture, functionality, and operation of possible implementations of systems, methods and computer program products according to various embodiments. The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A seat for a vehicle, the seat comprising a padding member, at least one phase change material element supported in a passage formed within the padding member, and a mechanism allowing positioning of the at least one phase change material element in either of a first location in which the at least one phase change material element is spaced apart from an occupant support side of the padding member when the seat is unoccupied, and a second location in which at least a portion of the at least one phase change material element is at least level with the occupant support side of the padding member when the seat is unoccupied.

2. The seat of claim 1 wherein the at least one phase change material element is supported in the passage such that a pressure applied by an occupant sitting in the seat compresses the padding member so as to move the occupant support side of the padding member toward the at least one phase change material element, so as to establish thermal communication between the at least one phase change material element and the occupant.

3. The seat of claim 1 wherein the at least one phase change material element is configured to be automatically movable from the first location to the second location when the seat is unoccupied and responsive to a temperature difference between the at least one phase change material element and a temperature of an interior of the vehicle outside the passage.

4. The seat of claim 1 wherein the at least one phase change material element is supported in the passage so as to be automatically movable from the second location to the first location responsive to a determination that a person is occupying a seat in which the at least one phase change material element is currently supported in the second location.

5. The seat of claim 1 wherein the mechanism comprises a movable mounting tray, and wherein the at least one phase change material element is coupled to the mounting tray so as to be movable with the mounting tray.

6. The seat of claim 5 further wherein the mechanism further comprises a mounting tray positioning mechanism structured to position and secure the mounting tray in either of a first position in which the at least one phase change material element is supported in the first location, and a second position in which the at least one phase change material element is supported in the second location.

7. The seat of claim 6 wherein the mounting tray positioning mechanism is structured to be manually operable.

8. The seat of claim 5 wherein the padding member has a second side opposite the occupant support side, wherein the at least one phase change material element is supported in the passage by a support mechanism coupled to the at least one phase change material element and to the mounting tray, wherein the passage has an opening along the second side of the padding member, and wherein the support mechanism extends into the opening.

9. The seat of claim 8 wherein the support mechanism comprises a stalk connected to the mounting tray and a spring member connecting the stalk to the at least one phase change material element.

10. The seat of claim 9 wherein the passage has an opening along the occupant support side of the padding member, and wherein the spring member is structured to resist compression of the spring member during compression of the padding member from the occupant support side of the padding member, until the at least one phase change material element is positioned within the opening along the occupant support side of the padding member.

11. The seat of claim 10 wherein the spring member is structured to compress during compression of the padding member from the occupant support side of the padding member, after the at least one phase change material element is positioned within the opening along the occupant support side of the padding member due to compression of the padding member from the occupant support side.

12. A sub-assembly for a vehicle seat, the sub-assembly comprising:
a padding member having at least one passage formed therein and extending between a first side of the padding member and a second side of the padding member opposite the first side, the at least one passage having a first opening along the first side of the padding member; and
at least one phase change material element supported in the at least one passage such that compression of the padding member along the first side of the padding member in a direction toward the at least one phase change material element moves the first opening toward the at least one phase change material element until the at least one phase change material element is positioned within the first opening,
wherein the at least one phase change material element is supported in the at least one passage by a support mechanism structured to resiliently deflect responsive to a force exerted by an occupant on the at least one phase change material element after the at least one phase change material element is positioned within the first opening.

13. The sub-assembly of claim 12 wherein the at least one phase change material element is supported in the at least one passage so as to be movable between a first location in which the at least one phase change material element is spaced apart from the first side of the padding member, and a second location in which the at least one phase change material element resides within the first opening.

14. The sub-assembly of claim 13 wherein the at least one passage has a first, relatively wider portion structured for receiving therein the at least one phase change material element when the at least one phase change material element is in the first location, and a relatively narrower portion extending from the relatively wider portion to the first side of the padding member.

15. The sub-assembly of claim 14 wherein the relatively narrower portion is structured to stretch to accommodate movement of the at least one phase change material element therealong as the at least one phase change material element moves from the first location to the second location.

16. The sub-assembly of claim 12 wherein the sub-assembly forms at least a portion of a seat bottom.

17. The sub-assembly of claim 12 wherein the sub-assembly forms at least a portion of a seat back.

18. The sub-assembly of claim 12 wherein the padding member is structured to thermally insulate the at least one phase change material element when the at least one phase change material element is positioned within the at least one passage and prior to positioning of the at least one phase change material element in the first opening.

19. The sub-assembly of claim 12 further comprising a cover formed from a thermally-conductive material and positioned in intimate contact with the padding member first side.

* * * * *